United States Patent [19]

Hughes et al.

[11] Patent Number: 4,701,489

[45] Date of Patent: Oct. 20, 1987

[54] PROCESS FOR THE PRODUCTION OF STABLE NONCORROSIVE AMORPHOUS POLYALPHAOLEFINS

[75] Inventors: Michael P. Hughes; Brian J. Pellon, both of Odessa, Tex.

[73] Assignee: El Paso Products Company, Odessa, Tex.

[21] Appl. No.: 904,579

[22] Filed: Sep. 8, 1986

[51] Int. Cl.$^4$ ............................ C08K 5/13; C08J 3/20
[52] U.S. Cl. ................................. 524/349; 524/350; 524/351
[58] Field of Search .............. 524/389, 583, 349, 350, 524/351; 526/74, 77, 84

[56] References Cited

U.S. PATENT DOCUMENTS

| | | | |
|---|---|---|---|
| 3,219,622 | 11/1965 | Luciani et al. | 524/583 |
| 3,773,743 | 11/1973 | Ainsworth et al. | 524/389 |
| 4,137,387 | 1/1979 | Miserlis et al. | 526/84 |
| 4,504,615 | 3/1985 | Mills | 524/389 |

*Primary Examiner*—Veronica P. Hoke
*Attorney, Agent, or Firm*—Fred S. Valles; Margareta LeMaire

[57] ABSTRACT

The catalyst residues present in an on-purpose produced amorphous polyalphaolefin are deactivated by contacting the molten polymer with sufficient water to provide at least a 3:1 water/Al mole ratio and then the polymer is stabilized with a hindered phenolic antioxidant.

5 Claims, 1 Drawing Figure

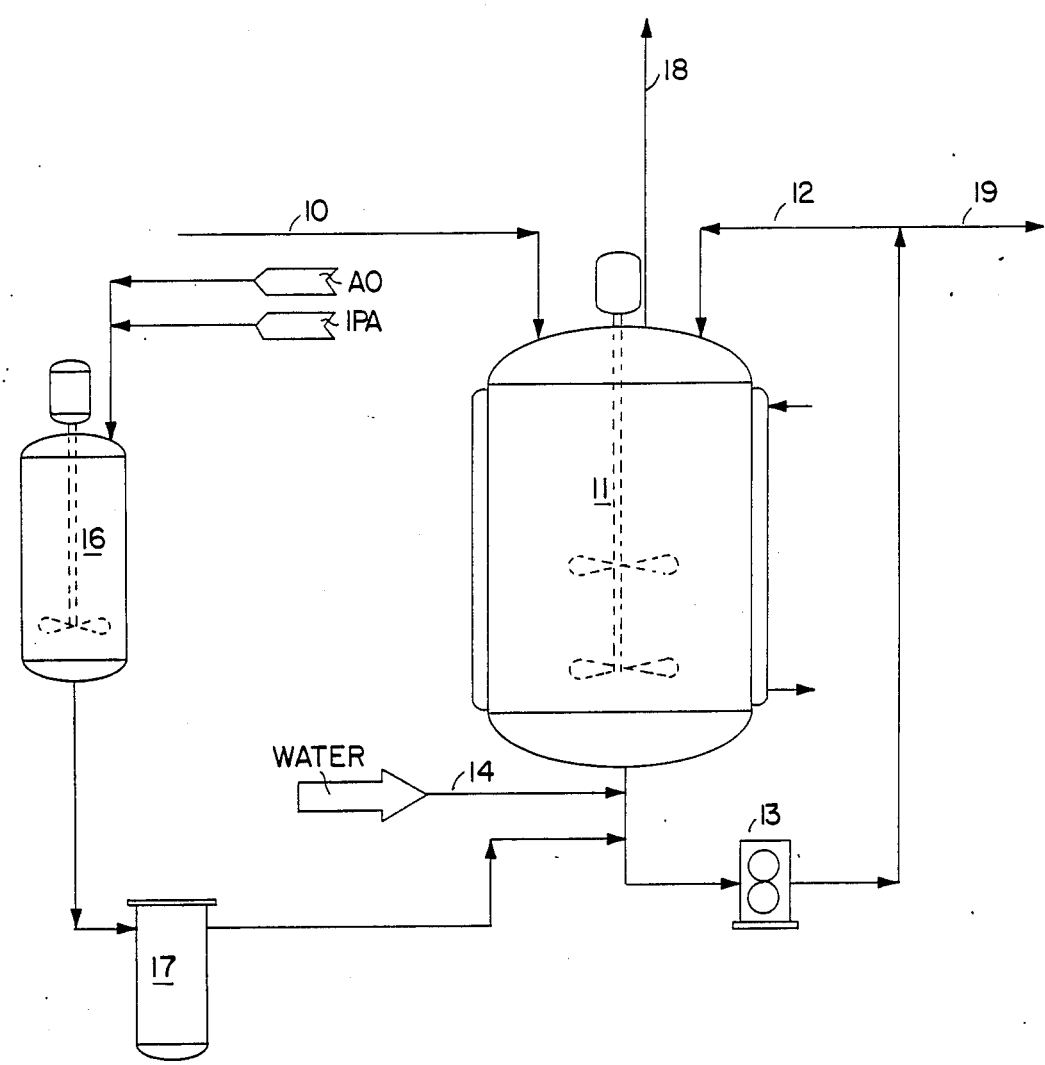

PROCESS FOR THE PRODUCTION OF STABLE NONCORROSIVE AMORPHOUS POLYALPHAOLEFINS

BACKGROUND OF THE INVENTION

The present invention relates to a method of deactivating catalyst residues in amorphous polyalphaolefins such as amorphous propylene homopolymers and copolymers. More particularly it relates to a novel deactivation method incorporated in bulk polymerization process for the direct production of substantially amorphous polyalphaolefins using a high-activity supported titanium chloride catalyst and an alkylaluminum co-catalyst. The amorphous polymer is the only product of the process and after separation of unreacted monomer(s) and deactivation of catalyst residues present in the polymer, it is conducted to storage at sufficiently elevated temperature to prevent unwanted solidification of the polymer in the process equipment. Often, the equipment for product storage and for transportation of the product to the user are also heated to facilitate withdrawal of the amorphous polymer in the molten stage. In order to prevent degradation due to heat, the polymer must be stabilized with a hindered phenolic antioxidant in accordance with conventional practice.

It was unexpectedly found, however, that when using deactivation and stabilization techniques otherwise conventionally and successfully employed in the production of high molecular weight highly crystalline alpha-olefin polymers such as isotactic propylene polymers, the resulting amorphous product was highly unstable. Specifically, when deactivating the catalyst resides by the injection of $C_3-C_8$ alcohol such as isopropyl alcohol into the hot devaporized product stream and subsequently adding a commercial hindered phenolic antioxidant, no significant quantities of the hindered phenolic antioxidant could be found by analysis of the supposedly stabilized product.

Also, the deactivation of the chloride containing catalyst residues in the polymer with the alcohol causes the liberation of hydrogen chloride with attendant corrosion problems in conduits and process vessels. A solution to the problem is to add a neutralizer such as aluminum magnesium hydroxycarbonate to the polymer, however, this adds considerably to the cost of the final product.

DESCRIPTION OF THE DRAWING

The FIGURE shows a schematic diagram of an embodiment of the process of the present invention.

THE INVENTION

Investigations leading up to the present invention showed that the catalyst was indeed deactivated by the alcohol treatment in that no further polymerization took place subsequent to the removal of the effluent from the reactor. However, it was unexpectedly found that the stabilization problem was still associated with the method of deactivating the polymer rather than being connected with the choice of antioxidant used in the stabilization of the polymer. Although not wishing to be bound by any particular theory, the inventors believe that the cause of the problem is attributed to the formation of an aluminum alcoholate reaction product between the alcohol deactivator and the organoaluminum co-catalyst, and the subsequent reaction between said reaction product and the hindered phenolic antioxidant to result in a compound that does not provide protection against oxidative degradation. The inventors found that this problem could be solved by utilizing small amounts of water as deactivating agent.

The inventors also found that the water deactivation resulted in a dramatic reduction in polymer corrosivity. The inventors believe that the problem of polymer corrosivity in the case of the conventional alcohol deactivation method is due to the formation of aluminum alcoholate which has no ability to neutralize the hydrogen chloride liberated in the deactivation. However, using water as the catalyst residue deactivator is believed to result in the formation of aluminum hydroxide which is an excellent hydrogen chloride neutralizer.

Thus, in accordance with the present invention, there is provided a process for preparing a stable and noncorrosive amorphous polyalphaolefin which comprises:

(1) withdrawing from a polymerization zone, a reactor effluent comprised of (a) unreacted monomer and (b) amorphous polyalphaolefin containing catalyst residues comprised of aluminum alkyl catalyst residues;

(2) heating the reactor effluent;

(3) separating molten amorphous polyalphaolefin from the effluent;

(4) intimately contacting the molten amorphous polyalphaolefin from step (3) with at least about 3 moles of water per mole of aluminum present in said polyalphaolefin, and (5) stabilizing the product of step (4) with a hindered phenolic antioxidant.

The preferred molar ratio of water/Al should range between about 5:1 and about 15:1. Sufficient contact time should be provided for the deactivation, generally at least 0.5 minutes, preferably at least 1 minute. There is no additional benefit at times greater than 3-4 minutes.

It is not important to the success of the present invention what polymerization conditions and catalyst system are chosen in the preparation of the amorphous polyalphaolefin. Nor is it important whether the polymer is a homopolymer or a copolymer. However, one particularly advantageous process for the production of such amorphous polyalphaolefins is disclosed in U.S. patent application Ser. No. 880,456, filed June 30, 1986, hereby incorporated by reference into this application.

The polymer products of the process of this invention have excellent properties making them useful in a variety of applications, such as for adhesives, caulking and sealing compounds, roofing compositions and others.

For a better understanding of the invention, reference is had to the accompanying drawing which depicts one exemplifying embodiment of the claimed process. An amorphous copolymer of a major proportion of propylene with ethylene as the remainder, e.g. about 85 wt % propylene and about 15 wt % ethylene, is obtained in line 10 from a flash zone (not shown) wherein most of the unreacted ethylene and propylene monomers, hydrogen and propane diluent present in the polymerization zone effluent had been removed from the copolymer. The stream has a temperature of about 350° F., a pressure of about 60 psig and contains in addition to the molten polymer small quantities of ethylene, propylene and propane.

The polymer itself contains small quantities of catalyst residues including residues of aluminum alkyls, in this case a 50/50 wt % blend of diethylaluminum chloride and triethylaluminum. The stream 10 is fed to one of the two steam jacketed stirred product hold tanks 11 (one shown) equipped with a recirculation loop 12 and recirculating pump 13. Water is continuously introduced (pump not shown) in line 14 in a sufficient quantity to provide a water/Al mole ratio of about 5:1 in the recirculating product stream. Antioxidant is dissolved in isopropylalcohol in stirred vessel 16, filtered by means of filter 17 and introduced by pump (not shown) to the circulation loop 12 when said vessel is filled. A vapor stream containing ethylene, propylene, propane, water and intermittently isopropylalcohol is withdrawn by means of line 18. After the first tank 11 has been filled to the desired capacity, the flows in line 10 and line 14 are stopped, stabilizer is added, and the stabilized contents are pumped to storage via line 19. At the same time second tank 11 (not shown) is put into service.

The following examples further illustrate the invention:

EXAMPLES 1 AND 2

In Control Example 1, molten amorphous propylene homopolymer containing about 400 ppm of aluminum calculated as the metal was passed through an agitated vessel and subsequent conduit (20' total length, 0.43" ID) at 400° F. and at a flow rate of 65 gms/min. The polymer was then mixed with 1097 ppm of Isonox ®129, a well known effective hindered phenolic antioxidant and analyzed for antioxidant content. As seen from the data in Table 1, only about 10% recovery of antioxidant was obtained without water deactivation.

Example 2 was carried in the same fashion except that 0.08 gms/min of water was also introduced into the vessel, which corresponds to about a 5:1 water/Al mole ratio. The water/polymer contact time was about 6.5 minutes. Analysis of the stabilized polymer showed about 100% recovery with the water deactivation treatment.

TABLE 1

| EXAMPLE NO. | Control 1 | 2 |
|---|---|---|
| Polymer Flow gms/min | 65 | 65 |
| Water flow gms/min | 0 | 0.08 |
| Water/Al mole ratio | 0 | 5 |
| Isonox ® 129 added-ppm | 1097 | 1097 |
| recovered-ppm | 125 | 1321 |

EXAMPLES 3, 4 AND 5

In Control Example 3, molten amorphous ethylene-propylene copolymer containing about 400 ppm of aluminum calculated as the metal was passed through the same agitated vessel and conduit of Control Example 1 modified to allow introduction of both deactivator and antioxidant solutions at polymer temperatures of 360° F. to 380° F. No deactivator was added while 1000 ppm of Isonox ®129 was added as a 10% solution in n-hexane. As seen in Table 2, only about 40% of the antioxidant was recovered and the polymer was highly corrosive.

Example 4 was carried out in the same fashion except that 0.222 g/min of isopropylalcohol was introduced into the vessel at a 5:1 isopropylalcohol/Al mole ratio. The IPA/polymer contact time was about 8.7 minutes. Analysis of this material again showed about 40% antioxidant recovery and highly corrosive polymer.

Example 5 was similarly carried out except that 0.134 g/min of water was introduced into the vessel at a water/polymer mole ratio equal to 5:1. The water/polymer contact time was about 4.4 minutes. Analysis of this water treated material showed ca. 100% recovery of the antioxidant and a polymer with no corrosivity.

TABLE 2

| EXAMPLE NO. | CONTROL 3 | 4 | 5 |
|---|---|---|---|
| Polymer flow, g/min | 56.8 | 51.8 | 102.3 |
| Deactivator | None | Isopropylalcohol | Water |
| Deactivator to Al mole ratio | 0 | 5/1 | 5/1 |
| Deactivator flow, g/min | 0 | 0.222 | 0.134 |
| Isonox ® 129 solution flow ml/min | 0.76 | 0.63 | 1.25 |
| Isonox ® 129 added, ppm | 1000 | 1000 | 1000 |
| recovered, ppm | 409 | 426 | 1102 |
| Corrosivity Index[1] | 4 | 4 | 0 |

[1]Corrosivity Index
0 - Non Corrosive
1 - Mildly Corrosive
2 - Moderately Corrosive
3 - Corrosive
4 - Highly Corrosive
5 - Very Highly Corrosive

EXAMPLE 6

A continuous pilot plant experiment was carried out treating about 60 lbs/hr of a molten devaporized amorphous ethylene-propylene copolymer stream containing about 0.28 moles/hr of aluminum with about 45 gms/hr of water at about 390°–400° F. and 12.9 minutes contact time.

The water was added at the beginning of a 51 foot long transfer line (1" ID) carring the polymer to a holding vessel, and anti-oxidant Isonox ®129 was added at the end of said transfer line just before said holding vessel. The experiment was carried out continuously for a week and the stabilized polymer was analyzed daily by gas chromatography for antioxidant content, the results being listed in Table 3 below. The treatment resulted in close to 90% recovery of the antioxidant.

TABLE 3

| | ANTIOXIDANT - PPM | |
|---|---|---|
| DAY | ADDED | FOUND |
| 1 | 300 | 330 |
| 2 | 300 | 255 |
| 3 | 300 | — |
| 4 | 300 | 200 |
| 5 | 300 | 264 |
| 6 | 900 | 907 |
| 7 | 1200 | 988 |

It is to be understood that many alterations and modifications can be made to the process of this invention. All such departures are considered within the scope of this invention as defined by the specification and appended claims.

What is claimed is:

1. A process for preparing a stable, non-corrosive amorphous polyalphaolefin which comprises:
   I. withdrawing from a polymerization zone, maintained at a temperature between about 130° F. and 175° F. and a pressure sufficient to maintain at least a portion of the monomer in liquid phase, a reactor effluent comprised of (a) unreacted monomer and (b) amorphous polyalphaolefin containing active catalyst residues comprised of aluminumalkyl and titanium halide catalyst residues in a molar ratio of Al/Ti in the range from about 50:1 to about 600:1;

II. heating the reactor effluent;

III. separating molten amorphous polyalphaolefin by flashing off monomer from the effluent;

IV. intimately contacting the molten amorphous polyalphaolefin from step (III) with steam resulting from addition of from about 3 to about 15 moles of water per mole of aluminum present in said polyalphaolefin to inactivate and to neutralize said catalyst residues present in the molten amorphous polyalphaolefin;

V. removing any excess steam not consumed in step (IV) from the molten amorphous polyalphaolefin containing the inactivated, neutralized catalyst residues of step (IV);

VI. stabilizing the molten amorphous polyalphaolefin of step (V) with a hindered phenolic antioxidant, and VII. recovering a stable, noncorrosive amorphous polyalphaolefin containing the inactivated, neutralized catalyst residues directly from step (VI).

2. The process of claim 1 wherein the molar ratio of water/aluminum is maintained between about 5:1 and about 15:1.

3. The process of claim 1 wherein the duration of the contacting in step (IV) is at least 0.5 minutes.

4. The process of claim 3 wherein the duration of the contacting is at least 1.0 minutes.

5. The process of claim 1 wherein the amorphous polyalphaolefin is a propylene-based polymer selected from the group consisting of amorphous propylene homopolymer, amorphous copolymers of propylene and ethylene and amorphous interpolymers of propylene, ethylene and another alpha-olefin having from 4 to 8 carbon atoms per molecule.

* * * * *